(12) United States Patent
Stöhr et al.

(10) Patent No.: US 11,493,133 B2
(45) Date of Patent: Nov. 8, 2022

(54) ELECTRICALLY CONDUCTIVE SEALING ASSEMBLY, AND ASSEMBLY HAVING TWO MACHINE ELEMENTS SEALED OFF WITH RESPECT TO ONE ANOTHER

(71) Applicant: Schaeffler Technologies AG & Co. KG, Herzogenaurach (DE)

(72) Inventors: Thomas Stöhr, Höchstadt (DE); Holger Mildenberger, Gerbrunn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 16/976,810

(22) PCT Filed: Jan. 11, 2019

(86) PCT No.: PCT/DE2019/100019
§ 371 (c)(1),
(2) Date: Aug. 31, 2020

(87) PCT Pub. No.: WO2019/166043
PCT Pub. Date: Sep. 6, 2019

(65) Prior Publication Data
US 2021/0003220 A1    Jan. 7, 2021

(30) Foreign Application Priority Data
Mar. 2, 2018   (DE) ..................... 10 2018 104 754.1

(51) Int. Cl.
*F16J 15/3284* (2016.01)
(52) U.S. Cl.
CPC ................. *F16J 15/3284* (2013.01)

(58) Field of Classification Search
CPC ....... F16J 15/32; F16J 15/3204; F16J 15/3284; F16C 33/78; F16C 33/82; F16C 2202/32
See application file for complete search history.

(56) References Cited

U.S. PATENT DOCUMENTS

| 2009/0063500 A1 | 3/2009 | Zhai et al. |
| 2016/0010750 A1* | 1/2016 | Colineau ................ F16J 15/322 |
| | | 277/565 |
| 2021/0115974 A1* | 4/2021 | Schamin ............... F16C 33/583 |

FOREIGN PATENT DOCUMENTS

| CN | 101765721 A | 6/2010 |
| CN | 105257828 A | 1/2016 |
| CN | 105822675 A | 8/2016 |
| CN | 206972767 U | 2/2018 |
| CN | 108386445 A | 8/2018 |

(Continued)

*Primary Examiner* — Gilbert Y Lee

(57) ABSTRACT

The present disclosure relates to a sealing assembly for sealing a space between a first machine element and a second machine element that is movable in relation to the first machine element. The first and second machine elements are arranged concentrically to each other. According to the invention, the sealing assembly is characterized in that it further comprises a conductive element that is used to establish an electrically conductive connection between the first and the second machine elements extending from the first machine element to the second machine element, and is mechanically connected at least in sections to the side of the seal facing away from the space to be sealed. The conductive element consists of an electrically conductive fiber fabric embedded in an elastomer matrix.

14 Claims, 1 Drawing Sheet

(56) References Cited

FOREIGN PATENT DOCUMENTS

| | | | | |
|---|---|---|---|---|
| DE | 102013000982 B4 | | 10/2015 | |
| DE | 102014010269 A1 | | 1/2016 | |
| DE | 102016217872 A1 | * | 4/2017 | ............. H02K 11/40 |
| DE | 102015224042 A1 | | 6/2017 | |
| DE | 1020161010926 A1 | | 9/2017 | |
| DE | 102017107326 A1 | | 10/2018 | |
| DE | 102017123653 A1 | * | 4/2019 | ............ F16J 15/3284 |
| DE | 102018104754 A1 | * | 9/2019 | ............. F16J 15/064 |
| DE | 102019110734 A1 | * | 10/2020 | ............. F16C 41/002 |
| DE | 102019112825 A1 | * | 11/2020 | ............. F16C 33/723 |
| DE | 102019119317 A1 | * | 1/2021 | .......... F16C 33/7856 |
| EP | 3048340 B1 | | 5/2018 | |
| JP | 2011231785 A | * | 11/2011 | .......... F16C 33/7853 |
| WO | WO-2020001674 A1 | * | 1/2020 | ............. F16C 33/583 |

* cited by examiner

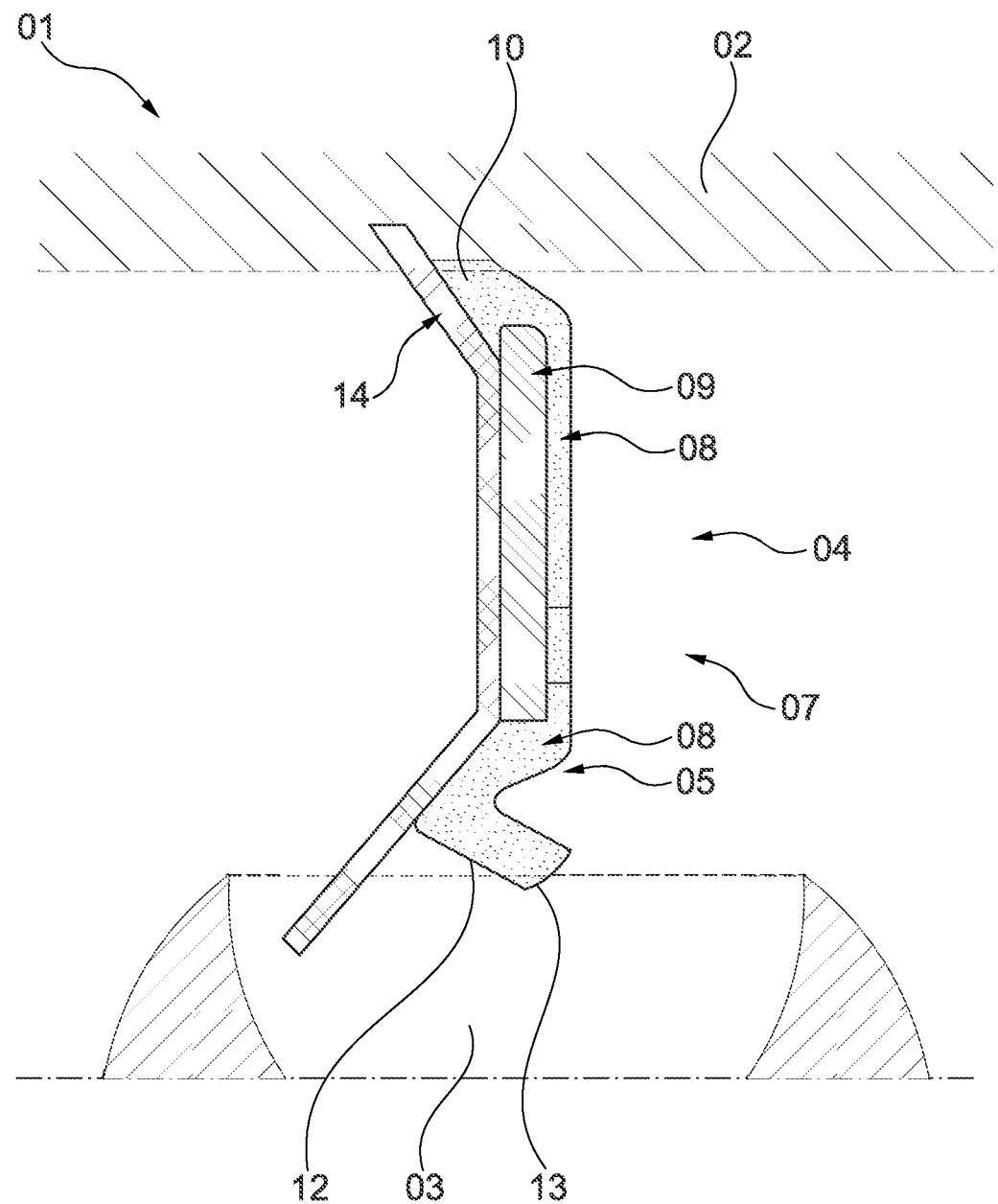

ELECTRICALLY CONDUCTIVE SEALING ASSEMBLY, AND ASSEMBLY HAVING TWO MACHINE ELEMENTS SEALED OFF WITH RESPECT TO ONE ANOTHER

CROSS-REFERENCE TO RELATED APPLICATIONS

This application is the U.S. National Phase of PCT Appln. No. PCT/DE2019/100019 filed Jan. 11, 2019, which claims priority to DE 10 2018 104 754.1 filed Mar. 2, 2018, the entire disclosures of which are incorporated by reference herein.

TECHNICAL FIELD

The present disclosure relates to a sealing assembly for sealing off a space between a first machine element and a second machine element that is movable in relation to the first machine element, the first and second machine elements being arranged concentrically to each other. The sealing assembly comprises a seal with a sealing seat that can be fixed on the first machine element and with a sealing lip having a sealing edge that bears against the second machine element when the seal is in the installed state. The disclosure further relates to an assembly having two machine elements sealed off with respect to one another.

BACKGROUND

Tensions are induced by the rapid rotation of rolling bearings installed in asynchronous machines, for example. When the stresses are dissipated via the bearing rings and the rolling elements, scoring can occur in the bearing raceways. Bearing protection rings, such as the bearing protection ring sold under the name AEGIS Bearing Protection Ring™, are used to reduce induced stresses. Bearing protection rings are screwed in front of the rolling bearing and dissipate the stresses by means of carbon fiber brushes distributed around the circumference. The disadvantage of this solution is that the carbon fiber brushes can become contaminated during operation, which can lead to a limitation of the electrical conductivity. In addition, the radial carbon fiber brushes have no active readjusting function to compensate for wear.

There are also electrically conductive nonwovens that can be attached to radial shaft seals and allow current to pass through a rolling bearing. However, additional axial installation space is required for the electrically conductive nonwovens. The electrically conductive component can only be adjusted to a limited extent in this solution. Such a solution is described in DE 10 2013 000 982 B4 and DE 10 2014 010 269 A1.

DE 10 2013 000 982 B4 shows a sealing ring with at least one dynamically stressed sealing lip and a buffer seal which is arranged at an axial distance adjacent to the sealing lip. The buffer seal consists of an electrically conductive nonwoven fabric to establish an electrically conductive connection and thus equipotential bonding between machine elements to be sealed off with respect to each other. The machine elements to be sealed off with respect to each other are contacted by the buffer seal.

DE 10 2014 010 269 A1 deals with a buffer seal comprising an annular disk made of an electrically conductive and air-permeable material and a support body. The disk is designed as a separately produced individual part with respect to the support body and connected to the support body. A nonwoven is preferably used as the material for the disk.

DE 10 2016 010 926 A1 describes a shaft grounding ring for dissipating induced stresses from a first machine element to a second machine element. The shaft grounding ring comprises an annular housing made of electrically conductive material, which is conductively connected to the one machine element. The housing is electrically conductively connected to a dissipating element made of an electrically conductive material, which is connected in an electrically conductive manner to the other machine element. The dissipating element is designed as a disk-shaped dissipating body which extends over at least part of the circumference of the shaft grounding ring.

SUMMARY

An electrically conductive sealing assembly for machine elements to be sealed off with respect to each other that does not require any additional installation space and is not subject to functional impairment due to contamination, is provided. A sealing assembly according to the appended claim 1 and an assembly according to the appended claim 8 serve to achieve the object according to the invention.

The sealing assembly according to the disclosure serves to seal a space between a first machine element and a second machine element that is movable in relation to the first machine element. The first and second machine elements are arranged concentrically to each other. The sealing assembly initially comprises a seal with a sealing seat that can be fixed onto the first machine element and a sealing lip with a sealing edge which, when the seal is installed, bears against the second machine element. It is essential to the disclosure that the sealing assembly further comprises a conductive element which extends from the first machine element to the second machine element to produce an electrically conductive connection between the first and the second machine elements. The conductive element is mechanically connected at least in sections to the side of the seal facing away from the space to be sealed. It consists of an electrically conductive fiber fabric embedded in an elastomer matrix. During production, the fiber fabric can be placed in the shaping tool and connected to the seal during the manufacturing process.

An advantage according to one example embodiment of the sealing assembly according to the disclosure is that it combines the current conduction function and the sealing function with one another in a compact structural unit. A current-conducting path between two machine elements can be created in a simple manner by means of the conductive element. The current-conducting function is maintained during the entire operating life of the seal, since the electrically conductive fiber fabric extends from the first machine element to the second machine element and therefore always ensures contact between the electrically conductive fiber fabric and the machine elements to be sealed. If wear occurs, this automatically "adjusts" the electrically conductive fiber fabric. A sealing assembly according to an example embodiment of the disclosure, for example installed in a rolling bearing, thus prevents damage to the rolling element raceway which can occur due to spark formation. The seal seals the space from environmental influences on the one hand and on the other hand ensures that lubricant and contaminant particles come out from the space into the contact area between the machine elements and the conductive element. This prevents contamination of the power line. There is no need for additional dust- and oil-repellent components such as fleece screens. In this way, costs can be saved. In addition, according to the disclosure, the frictional torque is reduced in comparison to solutions which require protective screens made of felt or fleece or similar components as protection against contamination. The separation of the conductive and sealing functions has the further advantage that wear particles from the fiber fabric cannot get into the space to be sealed. The sealing assembly is practically maintenance-free. The previous sealing geometries can be retained. According to the disclosure, seals with an electrical conductivity function are provided in a manner that is neutral in terms of installation space.

Carbon fibers, derivatives of carbon fibers, metallic fibers or filled polymer fibers are suitable as electrically conductive fibers. There should be no limitation of the fibers mentioned; other fibers with good electrical conductivity are also possible.

In one example embodiment, the conductive element extends beyond the seal when the sealing assembly is not installed. During assembly, the conductive element lies against the machine elements. A permanent electrical contact is ensured by covering the conductive fiber fabric of the conductive element with the machine elements, which ensures a long service life.

According to another example embodiment, the conductive element is connected to the seal in an integrally bonded manner. The conductive element and seal can be glued together. Alternatively, the conductive element can be vulcanized onto the seal. However, there should be no limitation of the connection types mentioned. Other types of connection that enable the conductive element to be reliably fixed to the seal are conceivable.

A further example embodiment uses a seal designed as a sealing ring and a conductive element designed as a conductive ring.

It has proven to be helpful to equip the seal with a reinforcement to which an elastomer body comprising the sealing lip is attached in a integrally bonded manner. The reinforcement effectively prevents the seal from being deformed by forces occurring during operation. The reinforcement may be made of sheet metal or other suitable materials.

The assembly according to the disclosure comprises a first machine element and a second machine element which is rotatable in relation to the first machine element, the first and second machine elements being arranged concentrically to each other, and the sealing assembly described above for sealing a space between the first and second machine elements. The assembly according to the disclosure preferably comprises one of the described preferred embodiments of the sealing assembly.

According to another example embodiment of the disclosure, the first and the second machine elements are bearing rings of a rolling bearing. In this case, the space to be sealed is a rolling element space which serves to accommodate rolling elements. The rolling element space is sealed by means of a sealing assembly. At the same time, the sealing assembly enables current to pass between the bearing rings.

In alternative applications, the first machine element can be a shaft, for example, and the second machine element can be a housing. The sealing assembly serves to seal a space between the shaft and the housing and also ensures the passage of current between the housing and the shaft and, if necessary, provides for grounding (equipotential bonding) of the assembly.

BRIEF DESCRIPTION OF THE DRAWINGS

FIG. 1 shows an example embodiment of the assembly according to the disclosure, which shows a sectional view of the assembly according to the disclosure.

DETAILED DESCRIPTION

The assembly 01 according to one example embodiment of the disclosure comprises a first machine element 02 and a second machine element 03 which can be rotated in relation to the first machine element 02. The first and second machine elements 02, 03 are arranged concentrically to each other and can be designed, for example, as bearing rings of a rolling bearing or as a housing and a shaft.

A further component of the assembly 01 is a sealing assembly 04. The sealing assembly 04 contains a seal 05, which in the embodiment shown is designed as a sealing ring. The seal 05 serves as a rotary seal for sealing a space 07 between the first and the second machine elements 02, 03. It consists of an elastomer body 08, which is connected to a reinforcement 09. The elastomer body 08 has a sealing seat 10, with which it is fixed to the first machine element 02, and a sealing lip 12 with a sealing edge 13, which bears against the second machine element 03. Designs with several sealing lips 12 are of course also possible.

The sealing assembly 04 furthermore comprises a ring-shaped conductive element 14 which extends from the first machine element 02 to the second machine element 03 to produce an electrically conductive connection between the first and the second machine elements 02, 03. The conductive element 14 is mechanically connected at least in sections to the side of the seal 05 facing away from the space 07 to be sealed. The integrally bonded connection can be realized as an adhesive connection or by vulcanizing the conductive element 14. The conductive element 14 consists of an electrically conductive fiber fabric embedded in an elastomer matrix. The electrically conductive fiber fabric can be made, for example, of carbon fibers, derivatives of carbon fibers, metallic fibers or filled polymer fibers. The conductive element 14 extends beyond the seal 05 in the radial direction. During assembly, the flexible conductive element 14 therefore lies against the machine elements 02, 03, as a result of which permanent electrical contact is established between the conductive element 14 and the machine elements 02, 03. A conductive path between the two machine elements 02, 03 is created by the conductive element 14. The cross sections of the electrically conductive fibers of the fiber fabric at the contact points of the conductive element 14 with the machine elements 02, 03 establish the electrical contact between the machine elements 02, 03 and the conductive element 14.

LIST OF REFERENCE SYMBOLS

01 Assembly
02 First machine element
03 Second machine element
04 Sealing assembly
05 Seal
06 -
07 Space
08 Elastomer body
09 Reinforcement
10 Sealing seat
11 -
12 Sealing lip
13 Sealing edge
14 Conductive element

The invention claimed is:

1. A sealing assembly for sealing a space between a first machine element and a second machine element movable in relation to the first machine element, the first and second machine elements being arranged concentrically to each other, comprising:
 a seal with an elastomer body including a sealing seat fixed on the first machine element and a sealing lip with a sealing edge that bears against the second machine element when the seal is installed, the seal including a reinforcement fastened to the elastomer body and disposed on a side of the seal facing away from a space to be sealed; and
 a conductive element which is used to establish an electrically conductive connection between the first and the second machine elements extending from the first machine element to the second machine element, wherein the conductive element is mechanically connected at least in sections with the side of the seal facing away from the space to be sealed, and wherein the conductive element includes an electrically conductive fiber fabric embedded in an elastomer matrix.

2. The sealing assembly according to claim 1, wherein the electrically conductive fiber fabric consists of carbon fibers, derivatives of carbon fibers, metallic fibers or filled polymer fibers.

3. The sealing assembly according to claim 1 wherein the conductive element extends beyond the seal when the sealing assembly is in the uninstalled state.

4. The sealing assembly according to claim 1, wherein the conductive element is connected with the seal in an integrally bonded manner.

5. The sealing assembly according to claim 4, wherein the conductive element is connected to the seal via an adhesive connection or is vulcanized onto the seal.

6. The sealing assembly according to claim 1, wherein the seal is designed as a sealing ring and the conductive element is designed as a conductive ring.

7. The sealing assembly according to claim 1, wherein the first and the second machine elements are bearing rings of a rolling bearing.

8. The sealing assembly according to claim 1, wherein the first machine element is a shaft and the second machine element is a housing.

9. The sealing assembly according to claim 1, wherein the conductive element is mechanically connected at least in sections with the reinforcement.

10. The sealing assembly according to claim 9, wherein the conductive element is mechanically connected at least in sections with the elastomer body.

11. A bearing assembly comprising a first machine element and a second machine element that is rotatable with respect to the first machine element, the first and second machine elements being arranged concentrically to each other, and further comprising a sealing assembly for sealing a space between the first and the second machine elements, wherein the first and the second machine elements are bearing rings of a rolling bearing, and that the space to be sealed is a rolling body space for receiving rolling bodies;
 the sealing assembly including a conductive element, which is used to establish an electrically conductive connection between the first and the second machine elements extending from the first machine element to the second machine element, and a seal including an elastomer body and a reinforcement fastened to the elastomer body, the reinforcement being disposed on a side of the seal facing away from a space to be sealed, wherein the conductive element is disposed on the side of the seal facing away from the space to be sealed.

12. The bearing assembly according to claim 11, wherein the conductive element is mechanically connected at least in sections with the side of the seal facing away from the space to be sealed, and wherein the conductive element includes an electrically conductive fiber fabric embedded in an elastomer matrix.

13. An assembly comprising a first machine element and a second machine element that is rotatable with respect to the first machine element, the first and second machine elements being arranged concentrically to each other, and further comprising a sealing assembly for sealing a space between the first and the second machine elements, wherein first machine element is a shaft and the second machine element is a housing;
 the sealing assembly including a conductive element, which is used to establish an electrically conductive connection between the first and the second machine elements extending from the first machine element to the second machine element, and a seal including an elastomer body and a reinforcement fastened to the elastomer body, the reinforcement being disposed on a side of the seal facing away from a space to be sealed, wherein the conductive element is disposed on the side of the seal facing away from the space to be sealed.

14. The assembly according to claim 13, wherein the conductive element is mechanically connected at least in sections with the side of the seal facing away from the space to be sealed, and wherein the conductive element includes an electrically conductive fiber fabric embedded in an elastomer matrix.

* * * * *